United States Patent [19]

Francisco

[11] Patent Number: 4,666,626

[45] Date of Patent: May 19, 1987

[54] PAINT STRIPPER COMPOSITIONS

[75] Inventor: Roland L. Francisco, Walnut, Calif.

[73] Assignee: C.L.M., Inc., Sun Valley, Calif.

[21] Appl. No.: 842,158

[22] Filed: Mar. 21, 1986

[51] Int. Cl.$^4$ .......................... C11D 7/32; C11D 7/50
[52] U.S. Cl. .................... 252/153; 252/154; 252/164; 252/165; 252/170; 252/171; 252/558; 252/364; 252/DIG. 8
[58] Field of Search .............. 134/38; 252/153, 154, 252/558, 165, 164, 170, 171, 364, DIG. 8

[56] References Cited

U.S. PATENT DOCUMENTS

| Re. 27,432 | 7/1972 | Torrenzano et al. | 134/12 |
| 1,483,587 | 2/1924 | Mains | 252/164 |
| 3,764,544 | 10/1973 | Haworth | 252/170 |
| 4,120,810 | 10/1978 | Palmer | 252/153 |
| 4,276,186 | 6/1981 | Bako et al. | 252/158 |
| 4,294,729 | 10/1981 | Bako et al. | 252/545 |
| 4,366,002 | 12/1982 | Carandang | 134/2 |
| 4,483,783 | 11/1984 | Albanese | 252/312 |

Primary Examiner—Prince E. Willis
Attorney, Agent, or Firm—Max Geldin

[57] ABSTRACT

Non-methylene chloride paint stripper composition consisting essentially of oxo-hexyl acetate as the chief cleaning agent, and cyclohexanone. The composition preferably also contains effective amounts of furfuryl alcohol, an aromatic solvent, particularly an aromatic naphtha solvent, methyl cellulose as thickener, and dodecyl benzene sulfonate as surface active agent. In preferred practice, effective amounts of N-methyl pyrrolidone, diisobutyl ketone and sodium xylene sulfonate wetting agent are also included.

9 Claims, No Drawings

PAINT STRIPPER COMPOSITIONS

BACKGROUND OF THE INVENTION

This invention relates to a paint stripper, and is particularly directed to an effective non-methylene chloride paint stripper for removing paint from various equipment employed in automobile paint booths rapidly and efficiently.

Various types of paint strippers are presently being employed, particularly for removing paint and cleaning equipment in automobile paint booths, including walls, paint hoses, spray equipment, and the like. Conventional paint strippers for this purpose generally are methylene chloride based stippers, that is, they contain a substantial amount of methylene chloride. Although such paint strippers have generally proved effective, it has recently been found that methylene chloride has a carcinogenic effect, and it is accordingly desirable to avoid the use of methylene chloride in paint strippers.

Further, certain presently employed strippers are not readily mixed and formulated to produce particularly a paint stripper having the proper viscosity and consistency for efficient spraying application employing a spray gun. In addition, certain of the presently utilized methylene chloride paint strippers are hazardous to employees in that they are readily flammable and combustible.

It is accordingly an object of the present invention to provide an effective non-methylene chloride paint stripper composition, particularly applicable for removing paint from walls, floors and cleaning equipment in automobile paint booths.

Another object is to provide a non-methylene chloride paint stripper composition which can be readily formulated for efficient spray gun application.

Another object is the provision of a paint stripper composition of the above type which rapidly removes paint from the equipment and areas in paint booths without requiring inordinate periods of waiting or soaking.

A still further object is to provide a non-methylene chloride paint stripper composition having non-carcinogenic components, and which is essentially non-flammable, and non-hazardous to handle by personnel.

Yet another object is to provide a paint stripper composition of the above type which emulsifies with and can be completely removed by water.

SUMMARY OF THE INVENTION

The above objects and advantages are achieved, according to the invention, and a non-methylene chloride paint stripper composition is provided, containing oxo-hexyl acetate as the chief cleaning agent. More particularly, the stripper composition consists essentially of a combination of oxo-hexyl acetate and cyclohexanone. The composition preferably also contains certain other components including furfuryl alcohol, an aromatic solvent, particularly an aromatic naphtha solvent, methyl cellulose as thickener, and dodecyl benzene sulfonate as surface active agent. The above components are employed in effective amounts, particularly in certain ranges of proportions, as set forth in greater detail below.

In preferred practice, other components including N-methyl pyrrolidone, diisobutyl ketone and sodium xylene sulfonate wetting agent are included, in effective amounts as also noted below.

The invention composition is particularly effective for cleaning the walls, floors and all equipment such as the spray equipment, of paint booths, for example, of an automobile assembly plant.

The non-methylene chloride paint stripper composition of the invention is readily formulated and applied as by spraying, and the paint is removed readily without any substantial waiting or soaking, followed by water rinsing to clean the removed paint. The paint stripper composition readily emulsifies with water and is removed completely by water. As formulated, the paint stripper composition is essentially non-flammable, non-carcinogenic and non-toxic.

DETAILED DESCRIPTION OF THE PREFERRED EMBODIMENTS

An essential component of the paint stripper composition of the invention is oxo-hexyl acetate, which functions as cleaning agent and solvent. This material, which is marketed as "EXXATE 600" by Exxon Chemicals, is generally employed in an amount of about 20 to about 30%, by weight of the stripper composition.

Another essential component is cyclohexanone, which also functions as a solvent. This material has a high flash point and is not as highly volatile as other ketone solvents. The amount of this material employed generally ranges from about 10 to about 15%, by weight.

The combination of oxo-hexyl acetate and cyclohexanone functions as the main solvent and cleaning medium of the invention paint stripper, the oxo-hexyl acetate component chiefly operating as the basic cleaning agent which replaces the methylene chloride component of conventional paint strippers. It was particularly unexpected to find that oxo-hexyl acetate has the cleaning and paint solvent characteristics of methylene chloride, without having any carcinogenic characteristics. Further, since the oxo-hexyl acetate is an ester solvent, it is essentially non-flammable which renders it safe for handling. The combination of oxo-hexyl acetate and cyclohexanone thus also functions to raise the flash point and reduce flammability of the stripper of the invention.

A thickener to maintain the paint stripper composition particularly on inclined or vertical surfaces, is also required. The preferred thickening agent in the paint stripper composition of the invention is a methyl cellulose. Such thickening agent, e.g. the material marketed as "METHOCEL F-4M" by Dow Chemical Co., is generally employed in an amount ranging from about 2 to about 5%, by weight. If desired, a similar material, carboxyl methyl cellulose, can be employed.

Furfuryl alcohol is another component in the paint stripper composition of the invention. This component functions as a solvent and also as a thickener, in combination with the methyl cellulose, noted above. Furfuryl alcohol is preferably employed in an amount ranging from about 20 to about 30%, by weight.

An aromatic solvent is also employed. The preferred aromatic solvent is the material marketed as "SC 100" by Chem Central. This material is an aromatic naphtha composed chiefly of aromatic solvent. The amount of such aromatic solvent employed can range from about 15 to about 30%, by weight. This aromatic solvent material functions to raise the flash point and thus reduce flammability of the stripper.

Also included in the paint stripper is dodecyl benzene sulfonate, which functions as a surface active agent. The incorporation of this material renders the entire blend readily emulsifiable when rinsed with water. This surface active agent, e.g. the material marketed as "Calsoft F-90" by Pilot Chemical Co., is employed in an amount ranging from about 3 to about 7%, by weight.

Other optional but preferred components can also be incorporated into the paint removing composition of the invention. These include N-methyl pyrrolidone, which functions to enhance the solvent power of the blend or composition, and also increases the flash point thereof. This material, e.g. the material marketed as "M-Pyrol" by BASF Wyandotte, is employed in an amount ranging from 0 to about 10%, preferably about 1 to about 10%, by weight.

Another optional component is diisobutyl ketone, which functions as a paint diluent in that it aids in cutting down the viscosity of the blend so that it is rendered more compatible for spraying consistency. This material also provides a more balanced drying time, that is it aids in balancing the time for drying, so that the paint stripper composition does not dry too fast or too slow. This material is employed in an amount ranging from 0 to about 10%, preferably about 1 to about 10%, by weight.

A further optional component which can be incorporated in the paint stripper of the invention is sodium xylene sulfonate. This material is a wetting agent, and functions as an efficient rinsing agent additive. Although the above described stripper is emulsifiable, the addition of this material renders rinsing of the paint stripper with water faster and more efficient. This optional material, e.g. in the form of the material marketed as "SXS 40%" (a 40% concentration in water of sodium xylene sulfonate) by Pilot Chemical Co., is employed in an amount ranging from 0 to 5%, preferably about 0.1 to about 5%, by weight of the stripper composition.

Although the above last three optional components can be deleted, superior results are achieved with these included. If such optional components are deleted, the viscosity of the stripper is somewhat altered and the flash point thereof will be reduced, tending to increase the flammability of the stripper.

In preparing the paint stripper compositions of the invention, it is preferred to admix first the cyclohexanone and the oxo-hexyl acetate components, and then add the methyl cellulose component, and premix these three components.

Thereafter, it is preferred to add in succession, while mixing the composition, first the furfuryl alcohol, then a portion of the dodecyl benzene sulfonate component, then the aromatic solvent component and the remainder of the dodecyl benzene sulfonate.

Thereafter, if desired, and in preferred practice, the above noted optional components in the order first of the N-methyl pyrrolidone, then the diisobutyl ketone and lastly the sodium xylene sulfonate are added, to complete the blending of the preferred paint stripper of the invention.

Paint stripper compositions according to the invention are set forth in the following table:

TABLE

| COMPONENTS | PERCENT BY WEIGHT | | |
| --- | --- | --- | --- |
| | A | B | C |
| Oxo-hexyl acetate | 24 | 21 | 24 |
| Cyclohexanone | 13 | 14 | 13 |
| Methyl cellulose | 3 | 2.5 | 3 |
| Furfuryl alcohol | 26 | 24 | 26 |
| SC 100 | 22 | 23 | 29 |
| Dodecyl benzene sulfonate | 5 | 4 | 5 |
| N—methyl pyrrolidone | 2 | 4 | — |
| Diisobutyl ketone | 4.75 | 6 | — |
| Sodium xylene sulfonate | 0.25 | 1.5 | — |
| | 100.0 | 100.0 | 100 |

Compositions A and B are particularly preferred and highly effective formulations for paint stripping according to the invention.

The paint stripper compositions of the invention are effective for cleaning all equipment in paint booths, e.g. of an automotive assembly line, including walls, paint hoses, steel plates, automatic spray equipment, enclosures, gratings, chain conveyors and covers. It can also be employed to clean the floors of paint spills, such as at paint storage rooms or paint mix rooms, and the floors particularly at the end of automotive paint booths where the paint generally drips off the item being painted.

The stripper composition of the invention can be applied by several methods, including spraying with a paint gun or by application of the paint stripper formulation using a roller or a scrub brush. Spraying is preferred since it is most rapid.

After application of the paint stripper composition to the item being cleaned, relatively little waiting time is required such as for soaking, and the like, and the area sprayed can be rinsed with water within a short time after applying the stripper, e.g. 1 to 3 minutes.

The paint stripper composition of the invention is water soluble and is essentially non-carcinogenic, non-toxic and non-flammable.

The following are examples of practice of the invention:

EXAMPLE I

Composition A of the table above was applied by spray gun application to the walls, floors and spray paint equipment of a paint booth at an automotive assembly facility.

About 3 minutes after application of the paint stripper spray, the items so sprayed were rinsed thoroughly with water, thereby cleaning the walls, floors, and spray paint equipment in the paint booth.

EXAMPLE II

Composition B of the table above when applied to the walls, floors and paint spray equipment in a paint booth, for paint removal and rinsed with water, produces results similar to Example I.

Composition C, although effective, however, is not as efficient in removing the paint from the items noted above in the paint booth, as the preferred compositions A and B in Examples I and II above.

From the foregoing, it is seen that the invention provides an efficient paint stripper composition, free of methylene chloride, and particularly advantageous for use in paint booths of automotive assembly plants, for readily removing paint from the walls, floors, and equipment thereof, rapidly and with simple water rinsing, the composition being non-carcinogenic and non-hazardous for handling by personnel, and being essentially non-flammable.

Since various changes and modifications of the invention will occur to those skilled in the art, the invention is not to be taken as limited except by the scope of the appended claims.

What is claimed is:

1. In a paint stripper composition free of methylene chloride, the improvement of employing oxo-hexyl acetate in effective amount as the chief cleaning agent.

2. A paint stripper composition free of methylene chloride, containing as essential solvent medium, a combination of effective amounts of oxo-hexyl acetate and cyclohexanone.

3. The paint stripper composition of claim 2, containing about 20 to about 30% oxo-hexyl acetate and about 10 to about 15% cyclohexanone, by weight.

4. The paint stripper composition of claim 2, including an effective amount of methyl cellulose as thickener.

5. The paint stripper composition of claim 4, including in addition, effective amounts of furfuryl alcohol, an aromatic solvent and dodecyl benzene sulfonate.

6. The paint stripper composition of claim 5, including in addition, effective amounts of N-methyl pyrrolidone, diisobutyl ketone and sodium xylene sultonate.

7. A paint stripper composition free of methylene chloride, containing, by weight, about 20 to about 30% of oxo-hexyl acetate, about 10 to about 15% of cyclohexanone, about 2 to about 5% of methyl cellulose, about 20 to about 30% of furfuryl alcohol, about 15 to about 30% of an aromatic naphtha, about 3 to about 7% of dodecyl benzene sulfonate, 0 to about 10% of N-methyl pyrrolidone, 0 to about 10% of diisobutyl ketone and 0 to about 5% of sodium xylene sulfonate.

8. The paint stripper composition of claim 7, said N-methyl pyrrolidone being present in an amount of about 1 to about 10%, said diisobutyl ketone being present in an amount of about 1 to about 10%, and said sodium xylene sulfonate being present in an amount of about 0.1 to about 5%, by weight.

9. The paint stripper composition of claim 8, and particularly adapted for removing paint from paint booths, consisting essentially of the following components and amounts thereof:

| COMPONENTS | % BY WEIGHT |
| --- | --- |
| Oxo-hexyl acetate | 24 |
| Cyclohexanone | 13 |
| Methyl cellulose | 3 |
| Furfuryl alcohol | 26 |
| Aromatic naphtha | 22 |
| Dodecyl benzene sulfonate | 5 |
| N—methyl pyrrolidone | 2 |
| Diisobutyl ketone | 4.75 |
| Sodium xylene sulfonate | 0.25 |
| | 100.0 |

* * * * *